US012756862B2

(12) United States Patent
Jeon et al.

(10) Patent No.: US 12,756,862 B2
(45) Date of Patent: Oct. 6, 2026

(54) INTRA PREDICTION METHOD OF CHROMINANCE BLOCK USING LUMINANCE SAMPLE, AND APPARATUS USING SAME

(71) Applicant: LG Electronics Inc., Seoul (KR)

(72) Inventors: Yong Joon Jeon, Seoul (KR); Seung Wook Park, Seoul (KR); Jae Hyun Lim, Seoul (KR); Jung Sun Kim, Seoul (KR); Joon Young Park, Seoul (KR); Young Hee Choi, Seoul (KR); Jae Won Sung, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/971,605

(22) Filed: Dec. 6, 2024

(65) Prior Publication Data

US 2025/0097459 A1 Mar. 20, 2025

Related U.S. Application Data

(63) Continuation of application No. 18/142,891, filed on May 3, 2023, now Pat. No. 12,200,252, which is a
(Continued)

(51) Int. Cl.
*H04N 19/593* (2014.01)
*G06T 9/00* (2006.01)
(Continued)

(52) U.S. Cl.
CPC ........... *H04N 19/593* (2014.11); *G06T 9/004* (2013.01); *H04N 19/11* (2014.11); *H04N 19/132* (2014.11);
(Continued)

(58) Field of Classification Search
CPC .... H04N 19/593; H04N 19/91; H04N 19/157; H04N 19/176; H04N 19/16; H04N 19/423; H04N 19/13; H04N 19/132; H04N 19/136; H04N 19/44; H04N 19/70; H04N 19/186; H04N 19/11; G06T 9/004
See application file for complete search history.

(56) References Cited

U.S. PATENT DOCUMENTS 8,249,154 B2 * 8/2012 Chen ...................... H04N 19/61 375/240.12
9,008,174 B2 * 4/2015 Zheng .................. H04N 19/136 375/240.12
(Continued)

*Primary Examiner* — Neil R Mikeska
(74) *Attorney, Agent, or Firm* — Fish & Richardson P.C.

(57) ABSTRACT

Disclosed are an intra prediction method of a chrominance block using a luminance sample and an apparatus using the same. An image decoding method comprises the steps of: calculating an intra prediction mode of a chrominance block on the basis of an LM mapping table when the chrominance block uses an LM; and generating a prediction block for the chrominance block on the basis of the calculated intra prediction mode of the chrominance block. When intra prediction mode information of chrominance blocks are decoded, mutually different tables are used depending on whether or not an LM is used, so that encoding and decoding can be performed without an unnecessary waste of bits.

3 Claims, 7 Drawing Sheets

Related U.S. Application Data continuation of application No. 17/506,087, filed on Oct. 20, 2021, now Pat. No. 11,677,977, which is a continuation of application No. 17/006,341, filed on Aug. 28, 2020, now Pat. No. 11,184,640, which is a continuation of application No. 16/458,633, filed on Jul. 1, 2019, now Pat. No. 10,798,415, which is a continuation of application No. 16/017,143, filed on Jun. 25, 2018, now Pat. No. 10,623,768, which is a continuation of application No. 15/790,236, filed on Oct. 23, 2017, now Pat. No. 10,009,631, which is a continuation of application No. 15/389,712, filed on Dec. 23, 2016, now Pat. No. 9,800,894, which is a continuation of application No. 14/000,900, filed as application No. PCT/KR2012/001637 on Mar. 6, 2012, now Pat. No. 9,530,224.

(60) Provisional application No. 61/589,308, filed on Jan. 21, 2012, provisional application No. 61/454,586, filed on Mar. 21, 2011, provisional application No. 61/449,698, filed on Mar. 6, 2011.

(51) Int. Cl.

| | |
|---|---|
| ***H04N 19/11*** | (2014.01) |
| ***H04N 19/132*** | (2014.01) |
| ***H04N 19/136*** | (2014.01) |
| ***H04N 19/16*** | (2014.01) |
| ***H04N 19/176*** | (2014.01) |
| ***H04N 19/186*** | (2014.01) |
| ***H04N 19/423*** | (2014.01) |
| ***H04N 19/44*** | (2014.01) |
| ***H04N 19/70*** | (2014.01) |

(52) U.S. Cl.

CPC ........... *H04N 19/136* (2014.11); *H04N 19/16* (2014.11); *H04N 19/176* (2014.11); *H04N 19/186* (2014.11); *H04N 19/423* (2014.11); *H04N 19/44* (2014.11); *H04N 19/70* (2014.11)

(56) References Cited

U.S. PATENT DOCUMENTS

| | | | | |
|---|---|---|---|---|
| 2012/0307897 | A1* | 12/2012 | Yang | H04N 19/136 375/240.12 |
| 2013/0051469 | A1* | 2/2013 | Park | H04N 19/159 375/240.14 |
| 2013/0182761 | A1* | 7/2013 | Chen | H04N 9/825 375/240.02 |

* cited by examiner

INTRA PREDICTION METHOD OF CHROMINANCE BLOCK USING LUMINANCE SAMPLE, AND APPARATUS USING SAME

CROSS REFERENCE TO RELATED APPLICATIONS

This application is a continuation of U.S. application Ser. No. 18/142,891, filed on May 3, 2023, which is a continuation of U.S. application Ser. No. 17/506,087, filed on Oct. 20, 2021, now U.S. Pat. No. 11,677,977, which is a continuation of U.S. application Ser. No. 17/006,341, filed on Aug. 28, 2020, now U.S. Pat. No. 11,184,640, which is a continuation of U.S. application Ser. No. 16/458,633, filed on Jul. 1, 2019, now U.S. Pat. No. 10,798,415, which is a continuation of U.S. application Ser. No. 16/017,143, filed on Jun. 25, 2018, now U.S. Pat. No. 10,623,768, which is a continuation of U.S. application Ser. No. 15/790,236, filed on Oct. 23, 2017, now U.S. Pat. No. 10,009,631, which is a continuation of U.S. application Ser. No. 15/389,712, filed on Dec. 23, 2016, now U.S. Pat. No. 9,800,894, which is a continuation of U.S. application Ser. No. 14/000,900, filed on Aug. 22, 2013, now U.S. Pat. No. 9,530,224, which is U.S. National Phase Application under 35 U.S.C. § 371 of International Application PCT/KR2012/001637, filed on Mar. 6, 2012, which claims the benefit of U.S. Provisional Application No. 61/449,698, filed on Mar. 6, 2011, U.S. Provisional Application No. 61/454,586, filed on Mar. 21, 2011, and U.S. Provisional Application No. 61/589,308, filed on Jan. 21, 2012, the entire contents of the prior applications are hereby incorporated by reference.

TECHNICAL FIELD

The present invention relates to image decoding method and device, and more particularly, to an intra chroma block prediction method using a luma sample and a device using the method.

BACKGROUND ART

Recently, demands for a high-resolution and high-quality image such as an HD (High Definition) image and an UHD (Ultra High Definition) image have increased in various fields of applications. As image data has higher resolution and higher quality, an amount of data more increases relative to existing image data. Accordingly, when image data is transferred using media such as existing wired and wireless broad band lines or is stored in existing storage media, the transfer cost and the storage cost increases. In order to solve these problems occurring with an increase in resolution and quality of image data, high-efficiency image compressing techniques may be utilized.

The image compressing techniques include various techniques such as an inter prediction technique of predicting pixel values included in a current picture from previous or subsequent pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Image data may be effectively compressed and transferred or stored using such image compressing techniques.

SUMMARY OF THE INVENTION

Technical Problem

An object of the invention is to provide an intra chroma block prediction method which may enhance image encoding and decoding efficiency.

Another object of the invention is to provide a device that performs the intra chroma block prediction method which may enhance image encoding and decoding efficiency.

Solution to Problem

According to an aspect of the invention, there is provided an image decoding method including: deriving an intra prediction mode of a chroma block on the basis of an LM mapping table when an LM (Luma Estimated Mode) is used for the chroma block; and generating a predicted block of the chroma block on the basis of the derived intra prediction mode of the chroma block.

The image decoding method may further include deriving the intra prediction mode of the chroma block on the basis of a non-LM mapping table when the LM is not used for the chroma block. When a planar mode is mapped onto a zeroth intra prediction mode, a DC mode is mapped onto a first intra prediction mode, and directive intra prediction modes are mapped onto second to 34-th intra prediction modes, the non-LM mapping table may be

| | IntraPredMode[xB][yB ] | | | | |
|---|---|---|---|---|---|
| intra_chroma_pred_mode | 0 | 26 | 10 | 1 | X (0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X. |

The image decoding method may further include decoding information on whether the LM is used for the chroma block.

The image decoding method may further include receiving codeword information which is obtained by encoding the intra prediction mode of the chroma block.

The codeword information may be codeword information generated on the basis of a codeword mapping table in which different codeword information elements are mapped depending on whether the LM is used for the chroma block. The codeword mapping table may be

| Value of intra_chroma_pred_mode | chroma_pred_from_luma_enabled_flag = 1 | chroma_pred_from_luma_enabled flag = 0 |
|---|---|---|
| 5 | 0 | n/a |
| 4 | 10 | 0 |
| 0 | 1100 | 100 |
| 1 | 1101 | 101 |

-continued

| Value of intra_chroma_pred_mode | chroma_pred_from_luma_enabled_flag = 1 | chroma_pred_from_luma_enabled flag = 0 |
|---|---|---|
| 2 | 1110 | 110 |
| 3 | 1111 | 111. |

A codeword of intra_chroma pred_mode corresponding to the LM or DM in the codeword mapping table is performed context decoding process and the other bits of the codeword except for the bits of the codeword used in the LM or DM in the codeword of intra_chroma_pred_mode corresponding to the intra prediction mode other than the LM or DM are performed a bypass encoding process.

When intra prediction is performed using the LM, two bits of a codeword is performed a context decoding process and the other bits of the codeword except for the bits performed the context encoding process is performed a bypass decoding process, and when intra prediction is performed without using the LM one bit of a codeword is performed a context decoding process and the bits of the codeword except for the bit performed the context decoding process is performed a bypass decoding process.

When a planar mode is mapped onto a zeroth intra prediction mode, a DC mode is mapped onto a first intra prediction mode, directive intra prediction modes are mapped onto second to 34-th intra prediction modes, and the LM is mapped onto a 35-th intra prediction mode, the LM mapping table may be

| | IntraPredMode[xB][yB] | | | | |
|---|---|---|---|---|---|
| intra_chroma_pred_mode | 0 | 26 | 10 | 1 | X (0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X. |

The LM may be an intra prediction method of calculating pixels of the chroma block on the basis of interpolated luma sample values calculated by linearly interpolating pixels of a luma block.

According to another aspect of the invention, there is provided an image decoding device including: an LM use determination module that determines information on whether an LM (Luma Estimated Mode) is used for a chroma block; and an intra chroma block prediction mode derivation module that derives an intra chroma block prediction mode on the basis of the LM mode use information output from the LM use determination module.

The intra chroma block prediction mode derivation module may generate a codeword on the basis of a codeword mapping table in which different codeword information elements are mapped depending on whether the LM is used for the chroma block. The codeword mapping table may be

| Value of intra_chroma_pred_mode | chroma_pred_from_luma_enabled_flag = 1 | chroma_pred_from_luma_enabled_flag = 0 |
|---|---|---|
| 5 | 0 | n/a |
| 4 | 10 | 0 |
| 0 | 1100 | 100 |
| 1 | 1101 | 101 |
| 2 | 1110 | 110 |
| 3 | 1111 | 111. |

A codeword of intra_chroma_pred_mode corresponding to the LM or DM in the codeword mapping table is performed a context decoding process and the other bits of the codeword except for the bits of the codeword used in the LM or DM in the codeword of intra_chroma_pred_mode corresponding to the intra prediction mode other than the LM or DM are performed a bypass encoding process.

When intra prediction is performed using the LM, two bits of a codeword is performed a context decoding process and the other bits of the codeword except for the bits performed the context encoding process is performed a bypass decoding process, and when intra prediction is performed without using the LM one bit of a codeword is performed a context decoding process and the bits of the codeword except for the bit performed the context decoding process is performed a bypass decoding process.

The intra chroma block prediction mode derivation module may derive the intra prediction mode of a chroma block on the basis of an LM mapping table when the LM is used for the chroma block and may derive the intra prediction mode of the chroma block on the basis of a non-LM mapping table when the LM is not used for the chroma block.

When a planar mode is mapped onto a zeroth intra prediction mode, a DC mode is mapped onto a first intra prediction mode, directive intra prediction modes are mapped onto second to 34-th intra prediction modes, and the LM is mapped onto a 35-th intra prediction mode, the LM mapping table may be

| | IntraPredMode[xB][yB] | | | | |
|---|---|---|---|---|---|
| intra_chroma_pred_mode | 0 | 26 | 10 | 1 | X ( 0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X. |

When a planar mode is mapped onto a zeroth intra prediction mode, a DC mode is mapped onto a first intra prediction mode, and directive intra prediction modes are mapped onto second to 34-th intra prediction modes, the non-LM mapping table may be

| | IntraPredMode[xB][yB] | | | | |
|---|---|---|---|---|---|
| intra_chroma_pred_mode | 0 | 26 | 10 | 1 | X (0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X. |

The LM may be an intra prediction method of calculating pixels of the chroma block on the basis of interpolated luma sample values calculated by linearly interpolating pixels of a luma block.

Advantageous Effects

As described above, by employing the intra chroma block prediction method using a luma sample and the device using the method according to the embodiments of the invention, it is possible to perform intra chroma block prediction by determining intra chroma block prediction mode information on whether an LM is used to perform intra prediction and using different mapping tables depending on the determination result.

DESCRIPTION OF EXEMPLARY EMBODIMENTS

Figure 1:
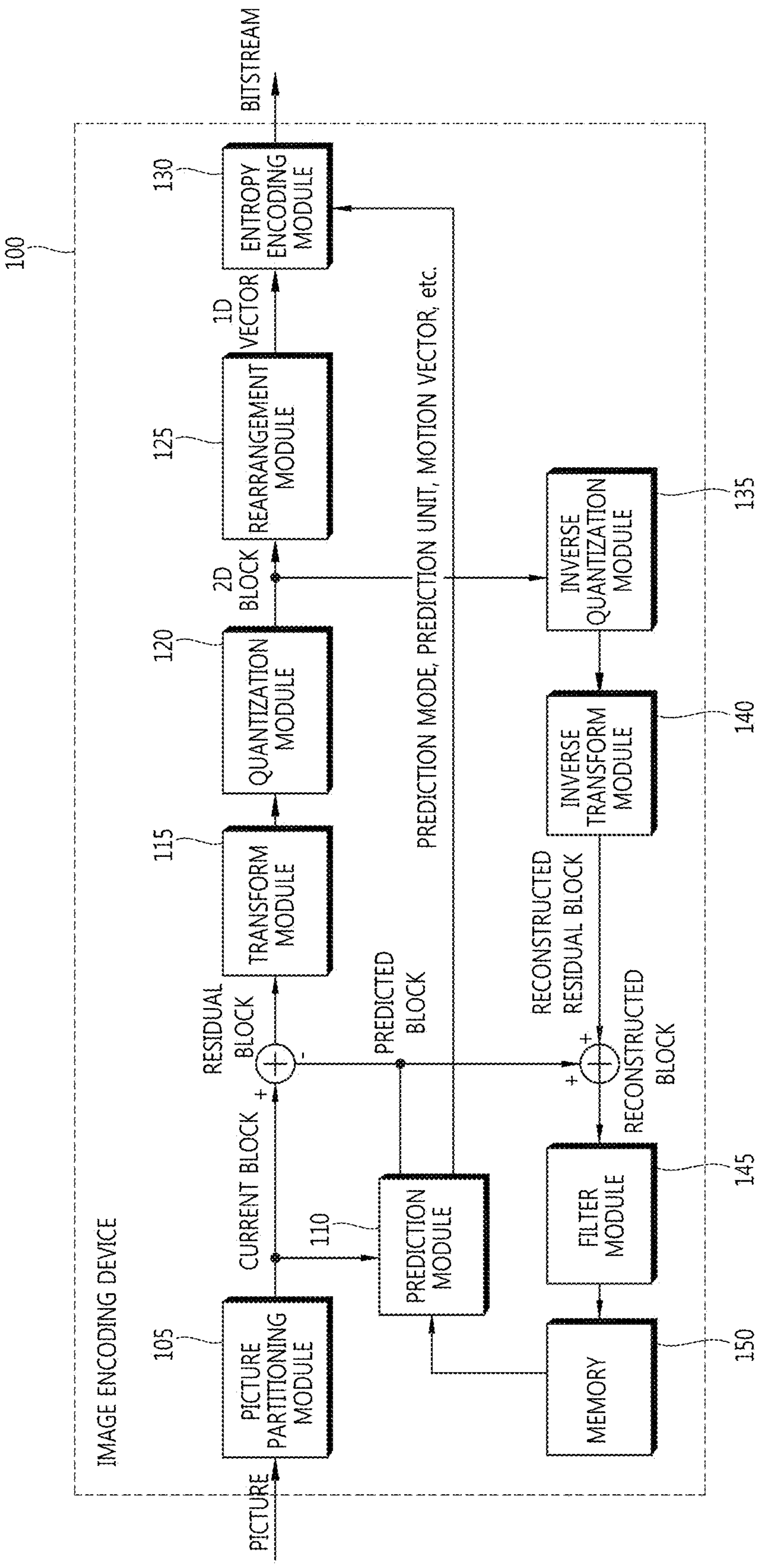
FIG. 1 is a block diagram illustrating an image encoding device according to an embodiment of the invention.

The present invention may be variously modified in various forms, and specific embodiments thereof will be described and shown in the drawings. However, the embodiments are not intended for limiting the invention, but it should be understood that the invention includes all the modifications, equivalents, and replacements belonging to the spirit and technical scope of the invention. In description with reference to the drawings, like constituents are referenced by like reference numerals.

Terms such as "first" and "second" may be used to describe various elements, but the elements are not limited to the terms. The terms are used only to distinguish one element from another element. For example, without departing from the scope of the invention, a first element may be named a second element and the second element may be named the first element similarly. The term, "and/or", includes a combination of plural elements or any one of the plural elements.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, exemplary embodiments of the invention will be described in detail with reference to the accompanying drawings. Like constituents in the drawings will be referenced by like reference numerals and will not be repeatedly described.

FIG. 1 is a block diagram illustrating an image encoding device according to an embodiment of the invention.

Referring to FIG. 1, an image encoding device 100 includes a picture partitioning module 105, a prediction module 110, a transform module 115, a quantization module 120, a rearrangement module 125, an entropy encoding module 130, an inverse quantization module 135, an inverse transform module 140, a filter module 145, and a memory 150.

The constituents shown in FIG. 1 are independently shown to represent different distinctive functions in the image encoding device. Each constituent is not constructed by an independent hardware constituent or software constituent. That is, the constituents are independently arranged and at least two constituents may be combined into a single constituent or a single constituent may be divided into plural constituents to perform functions. Embodiments in which the constituents are combined and embodiments in which the constituents are separated belong to the scope of the invention without departing from the concept of the invention.

Some constituents are not essential to the substantial functions in the invention and may be optional constituents for merely improving performance. The invention may be embodied to include only constituents essential to embodiment of the invention, except for the constituents used to merely improve performance. The structure including only the essential constituents except for the optical constituents used to merely improve performance belongs to the scope of the invention.

The picture partitioning module 105 may partition an input picture into at least one process unit. Here, the process unit may be a prediction unit (PU), a transform unit (TU), or a coding unit (CU). The picture partitioning module 105 may partition a picture into combinations of plural coding units, prediction units, and transform units and may select a combination of coding units, prediction units, and transform units on the basis of a predetermined criterion (for example, a cost function) to encode the picture.

For example, a picture may be partitioned into plural coding units. A recursive tree structure such as a quad tree structure may be used to partition a picture into coding units. A coding unit which may be a picture or a coding unit of a maximum size as root may be partitioned into different coding units with child nodes corresponding to the number of partitioned coding units. A coding unit which is not partitioned any more in accordance with a predetermined limitation is a leaf node. That is, when it is assumed that a coding unit may be partitioned in only a square shape, a single coding unit may be partitioned into a maximum of four different coding unit.

In the embodiments of the invention, a coding unit may be used to have a meaning of a unit to be decoded as well as a unit to be encoded.

A prediction unit may be partitioned in at least one square or rectangular shape with the same size in a coding unit, or may be partitioned in shapes such that the shape of one prediction unit of partitioned prediction units in a coding unit is different from the shape of another prediction unit.

When a coding unit, which is used to generate a prediction unit to be subjected to intra prediction, is not a minimum coding unit, the coding unit may be subjected to intra prediction without being partitioned into plural prediction units (N×N).

The prediction module 110 includes an inter prediction module that performs inter prediction and an intra prediction module that performs intra prediction. The prediction module may determine which of inter prediction or intra prediction should be performed on a prediction unit, and may determine specific information (for example, intra prediction mode, motion vector, and reference picture) of the determined prediction method. At this time, the process unit on which the prediction is performed may be different from the process unit for which the prediction method and the specific information are determined. For example, the prediction method and the prediction mode may be determined for each prediction unit and the prediction may be performed for each transform unit. Residual values (residual block) between the generated predicted block and the original block are input to the transform module 115. The prediction mode information, the motion vector information, and the like used for the prediction are encoded along with the residual values by the entropy encoding module 130 and are transmitted to the decoding device. When a specific encoding mode is used, the original block may be encoded and transmitted to the decoding device without generating a predicted block through the use of the prediction module 110.

The inter prediction module may predict a prediction unit on the basis of information of at least one picture of a previous picture and a subsequent picture of a current picture. The inter prediction module may include a reference picture interpolation module, a motion prediction module, and a motion compensation module.

The reference picture interpolation module is supplied with reference picture information from the memory 150 and generates pixel information less than an integer pixel from the reference picture. In case of luma pixels, a DCT-based 8-tap interpolation filter having different filter coefficients may be used to generate the pixel information less than an integer pixel in the unit of ¼ pixel. In case of chroma pixels, a DCT-based 4-tap interpolation filters having different filter coefficients may be used to generate the pixel information less than an integer pixel in the unit of ⅛ pixel.

The motion prediction module may perform motion prediction on the basis of the reference picture interpolated by the reference picture interpolation module. Various methods such as FBMA (Full search-based Block Matching Algorithm), TSS (Three Step Search), and NTS (New Three-Step Search Algorithm) may be used to calculate a motion vector. A motion vector has a motion vector value in the unit of ½ or ¼ pixel on the basis of the interpolated pixel. The motion prediction module may predict a current prediction unit using different motion prediction methods. Various methods such as a skip method, a merging method, and an AMVP (Advanced Motion Vector Prediction) method may be used as the motion prediction method.

A method of constructing a predicted motion vector candidate list at performing inter prediction using the AMVP method according to an embodiment of the invention will be described below.

The intra prediction module may generate a prediction unit on the basis of reference pixel information around a current block which is pixel information in the current picture. When a block around the current prediction unit is a block having been subjected to the inter prediction and a reference pixel is a pixel having been subjected to the inter prediction, reference pixels of the block having been subjected to the inter prediction may be replaced with reference pixel information of a block having been subjected to the intra prediction. That is, when a reference pixel is not available, the reference pixel information not available may be replaced with at least one reference pixel of the available reference pixels.

The prediction mode of intra prediction includes a directive prediction mode in which reference pixel information is used depending on the prediction direction and a non-directive prediction mode in which directivity information is not used to perform prediction. The mode for predicting luma information and the mode for predicting chroma information may be different from each other. Intra prediction mode information obtained by luma information or predicted luma signal information may be used to predict the chroma information.

When the size of a prediction unit and the size of a transform unit are equal to each other at performing intra prediction, the intra prediction of the prediction unit may be performed on the basis of pixels located on the left side of the prediction unit, a pixel located at the left-upper end, and pixels located at the upper end. On the other hand, when the size of a prediction unit and the size of a transform unit are different from each other at performing intra prediction, the intra prediction may be performed using reference pixels based on the transform unit. Intra prediction using N×N partitioning for only the minimum coding unit may be performed.

In the intra prediction method, an MDIS (Mode Dependent Intra Smoothing) filter is applied to reference pixels depending on the prediction mode and then a predicted block may be generated. The type of the MDIS filter applied to the reference pixels may vary. In the intra prediction method, the intra prediction mode of a current prediction unit may be predicted from the intra prediction mode of a prediction unit located around the current prediction unit. When the prediction mode of the current prediction unit is predicted using the mode information predicted from the neighboring prediction units and the intra prediction modes of the current prediction unit, if the neighboring prediction units are equal to each other, information representing that the prediction modes of the current prediction unit and the neighboring prediction units are equal to each other may be transmitted using predetermined flag information. If the prediction modes of the current prediction unit and the neighboring prediction units are different from each other, the prediction mode information of the current block may be encoded by performing entropy encoding.

A residual block including residual information which is a difference between a prediction unit and the original block of the prediction unit may be generated. The generated residual block may be input to the transform module 115. The transform module 115 may transform the residual block including the residual information of the prediction unit generated by the prediction module 110 and the original block using a transform method such as DCT (Discrete Cosine Transform) or DST (Discrete Sine Transform). Which of the DCT and the DST is used to transform the residual block may be determined on the basis of the intra prediction mode information of the prediction unit used to generate the residual block.

The quantization module 120 may quantize values transformed into the frequency domain by the transform module 115. The quantization coefficients may be changed depending on the block or the degree of importance of a picture. The values output from the quantization module 120 may be supplied to the inverse quantization module 135 and the rearrangement module 125.

The rearrangement module 125 may rearrange the coefficient values with respect to the quantized residual values.

The rearrangement module 125 may change two-dimensional block type coefficients to one-dimensional vector type coefficients through the use of a coefficient scanning method. For example, the rearrangement module 125 may scan DC coefficients to coefficients of the high frequency domain using a zigzag scanning method to change the scanned coefficients to one-dimensional vector type coefficients. A vertical scanning method of scanning two-dimensional block type coefficients in the column direction and a horizontal scanning method of scanning two-dimensional block type coefficients in the row direction may be used instead of the zigzag scanning method depending on the size of a transform unit and the intra prediction mode. That is, which of the zigzag scanning method, the vertical scanning method, and the horizontal scanning method should be used may be determined depending on the size of a transform unit and the intra prediction mode.

The entropy encoding module 130 may perform entropy encoding on the basis of the values generated by the rearrangement module 125. Various encoding methods such as exponential golomb coding, VLC (Variable length Coding), and CABAC (Context-Adaptive Binary Arithmetic Coding) may be used for the entropy encoding.

The entropy encoding module 130 may encode a variety of information such as residual coefficient information and block type information of a coding unit, prediction mode information, partitioning unit information, prediction unit information, transfer unit information, motion vector information, reference frame information, block interpolation information, and filtering information from the rearrangement module 125 and the prediction module 110.

The entropy encoding module 130 may entropy-encode coefficient values of the coding unit input from the rearrangement module 125.

The inverse quantization module 135 and the inverse transform module 140 inversely quantize the values quantized by the quantization module 120 and inversely transform the values transformed by the transform module 115. The residual values generated by the inverse quantization module 135 and the inverse transform module 140 may be added with the prediction unit, which is predicted by the motion vector prediction module, the motion compensation module, and the intra prediction module of the prediction module 110, to generate a reconstructed block.

The filter module 145 may include at least one of a deblocking filter, an offset correction module, and an ALF (Adaptive Loop Filter).

The deblocking filter 145 may remove block distortion generated due to the boundary between blocks in the reconstructed picture. Whether the deblocking filter is applied to a current block may be determined on the basis of the pixels included in several rows or columns of the block. When the deblocking filter is applied to a block, a strong filter or a weak filter may be applied depending on the necessary deblocking filtering strength. When performing horizontal filtering and vertical filtering for applying the deblocking filter, the horizontal filtering and the vertical filtering may be performed in parallel.

The offset correction module may correct an offset of the picture performed the deblocking from the original picture in the unit of pixels. A method of partitioning the pixels of a picture into a predetermined number of regions, determining a region to be subjected to the offset correction, and applying the offset correction to the determined region or a method of applying the offset correction in consideration of edge information of each pixel may be used to perform the offset correction on a specific picture.

The ALF (Adaptive Loop Filter) may perform filtering on the basis of comparison result of the filtered reconstructed picture and the original picture. The pixels included in a picture may be partitioned into predetermined groups, a filter to be applied to each group may be determined, and the filtering may be differently performed for each group. Information on whether the ALF should be applied may be transferred by the coding units (CU) and the size and coefficients of the ALF to be applied to each block may vary. The ALF may have various types and the number of coefficients included in the corresponding filter may vary. The filtering-related information (such as filter coefficient information, ALF ON/OFF information, and filter type information) of the ALF may be included and transferred in a predetermined parameter set of a bitstream.

The memory 150 may store the reconstructed block or picture output from the filter module 145 and the stored reconstructed block or picture may be supplied to the prediction module 110 when performing the inter prediction.

Figure 2:
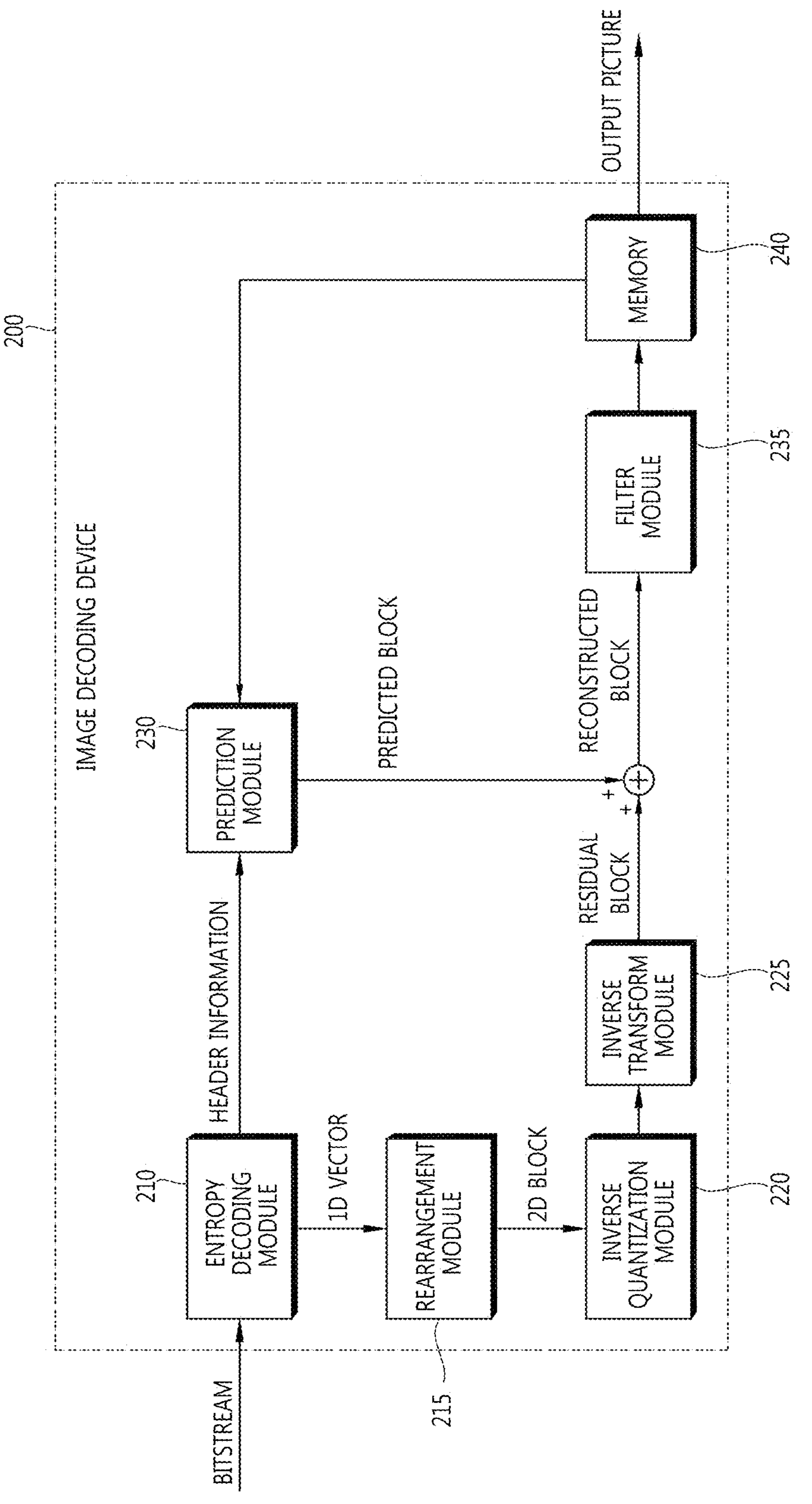
FIG. 2 is a block diagram illustrating an image decoding device according to an embodiment of the invention.

FIG. 2 is a block diagram illustrating an image decoding device according an embodiment of the invention.

Referring to FIG. 2, an image decoding device 200 includes an entropy decoding module 210, a rearrangement module 215, an inverse quantization module 220, an inverse transform module 225, a prediction module 230, a filter module 235, and a memory 240.

When an image bitstream is input from the image encoding device, the input bitstream may be decoded in the inverse order of that in the image encoding device.

The entropy decoding module 210 may perform entropy decoding in the inverse order of the entropy encoding process performed the entropy encoding module of the image encoding device. The residual values performed the entropy decoding by the entropy decoding module may be input to the rearrangement module 215.

The entropy decoding module 210 may decode information associated with the intra prediction and the inter prediction performed by the encoding device. As described above, there are predetermined restrictions in performing the intra prediction and the inter prediction, the entropy decoding module may perform the entropy decoding based on the restrictions to get the information of a current block associated with the intra prediction and the inter prediction.

The rearrangement module 215 may perform rearrangement on the bitstream entropy-decoded by the entropy decoding module 210 on the basis of the rearrangement method of the encoding module. The rearrangement module may reconstruct and rearrange coefficients expressed in the form of one-dimensional vector into two-dimensional block type coefficients. The rearrangement module 215 may be supplied with information associated with the coefficient scanning performed by the encoding module and may perform the rearrangement using a method of inversely scanning the coefficients on the basis of the scanning order in which the scanning is performed by the encoding module.

The inverse quantization module 220 may perform inverse quantization on the basis of the quantization parameters supplied from the encoding device and the rearranged coefficient values of the block.

The inverse transform module 225 may perform the inverse DCT and inverse DST depending on the DCT and DST, which has been performed by the transform module in the image encoding device. The inverse transform may be performed on the basis of a transfer unit determined by the image encoding device. The transform module of the image encoding device may selectively perform the DCT and DST depending on plural information elements such as the prediction method, the size of the current block, and the prediction direction, and the inverse transform module 225 of the image decoding device may perform the inverse transform on the basis of the transform information performed by the transform module of the image encoding device.

The inverse transform may be performed by the coding units instead of the transform units having been subjected to the transform.

The prediction module 230 may generate a predicted block on the basis of predicted block generation information supplied from the entropy decoding module 210 and the previously-decoded block or picture information supplied from the memory 240.

As described above, similarly to the operation of the image encoding device, when the size of a prediction unit and the size of a transform unit are equal to each other at performing the intra prediction, the intra prediction on the prediction unit is performed on the basis of pixels located on the left side of the prediction unit, a pixel located at the left-upper end, and pixels located at the upper end. On the other hand, when the size of a prediction unit and the size of a transform unit are different from each other at perform intra prediction, the intra prediction may be performed using reference pixels based on the transform unit. Intra prediction using N×N partitioning for only the minimum coding unit may be performed.

The prediction module 230 includes a prediction unit determination module, an inter prediction module, and an intra prediction module. The prediction unit determination module may receive a variety of information such as prediction unit information input from the entropy decoding module, prediction mode information of the intra prediction method, and motion prediction-related information of the inter prediction method, may determine a prediction unit from the current coding unit, and may determine which of the inter prediction and the intra prediction should be performed on the prediction unit. The inter prediction module may perform the inter prediction on the current prediction unit on the basis of information included in at least one picture of a previous picture and a subsequent picture of the current picture including the current prediction unit using information necessary for the inter prediction of the current prediction unit supplied from the image encoding device.

In order to perform the inter prediction, it may be determined which of a skip mode, a merging mode, and an AMVP mode is the motion prediction method of the prediction unit included in the coding unit on the basis of the coding unit.

The intra prediction module may generate a predicted block on the basis of pixel information in the current picture. When a prediction unit is the prediction unit applied to the intra prediction, the intra prediction may be performed on the basis of the intra prediction mode information of the prediction unit supplied from the image encoding device. The intra prediction module may include an MDIS filter, a reference pixel interpolation module, and a DC filter. The MDIS filter performs filtering on the reference pixels of the current block. It is determined whether the filter should be applied depending on the prediction mode of the current prediction unit. The MDIS filter may perform filtering on the reference pixels of the current block using the prediction mode of the prediction unit and the MDIS filter information supplied from the image encoding device. When the prediction mode of the current block is a mode in which the MDIS filtering is not performed, the MDIS filter may not be applied.

When the prediction mode of the prediction unit is a prediction unit to be applied to the intra prediction on the basis of the pixel values obtained by interpolating the reference pixels, the reference pixel interpolation module may generate reference pixels in the unit of pixels less than an integer by interpolating the reference pixels. When the prediction mode of the current prediction unit is a prediction mode in which a predicted block is generated without interpolating the reference pixels, the reference pixels may not be interpolated. When the prediction mode of the current block is the DC mode, the DC filter may generate a predicted block through filtering.

The reconstructed block or picture may be supplied to the filter module 235. The filter module 235 includes a deblocking filter, an offset correction module, and an ALF.

Information on whether the deblocking filter is applied to the corresponding block or picture and information on which of the strong filter and the weak filter has been applied when the deblocking filter has been applied may be supplied from the image encoding device. The deblocking filter of the image decoding device may be supplied with the deblocking filter-related information from the image encoding device and may perform deblocking filtering on the corresponding block in the decoding device. Similarly to the image encoding device, the vertical deblocking filtering and the horizontal deblocking filter are first performed, where at least one of the vertical deblocking filtering and the horizontal deblocking filtering may be performed on an overlapping portion. The vertical deblocking filtering or the horizontal deblocking filtering which is not previously performed may be performed on the portion in which the vertical deblocking filtering and the horizontal deblocking filtering overlap. The parallel processing of the deblocking filtering processes may be performed through this deblocking filtering.

The offset correction module may perform offset correction on the reconstructed picture on the basis of the type of the offset correction and the offset value information applied to the picture in encoding.

The ALF may perform the filtering on the basis of the comparison result between the reconstructed picture subjected to the filtering and the original picture. The ALF may be applied to the coding unit on the basis of the ALF application information and the ALF coefficient information supplied from the encoding device. The ALF information may be included and supplied in a specific parameter set.

The memory 240 may store the reconstructed picture or block for use as a reference picture or a reference block and may supply the reconstructed picture to an output module.

As described above, in the embodiments of the invention, the coding unit is used as a term representing an encoding unit, but may be used as a unit of decoding as well as encoding.

An image encoding method and an image decoding method to be described later in the embodiments of the invention may be performed by the constituents of the image encoding device and the image decoding device described above with reference to FIGS. 1 and 2. The constituents may include software process units which may be performed through algorithms, as well as hardware constituents.

Figure 3:
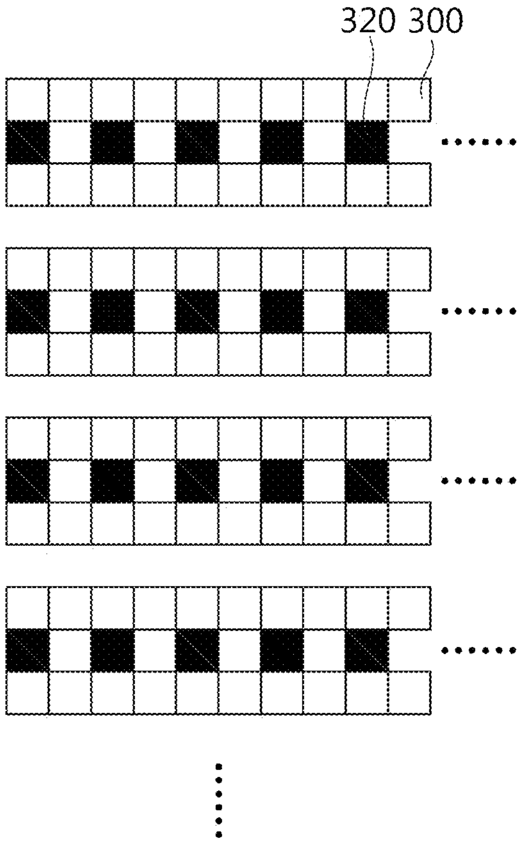
FIG. 3 is a conceptual diagram illustrating positions of luma samples and chroma samples in an embodiment of the invention.

FIG. 3 is a conceptual diagram illustrating locations of luma samples and chroma samples according to an embodiment of the invention.

Referring to FIG. 3, the sampling rate and the sampling positions of luma samples 300 and chroma samples 320 may be different from each other.

The luma samples 300 and the chroma samples 320 may constitute a picture in various formats. For example, when YUV 4:2:0 sampling is used for the luma samples 300 and the chroma samples 320 of a picture, the chroma samples 320 Cb and Cr may be located between the luma samples 300. Therefore, the luma samples 300 and the chroma samples 320 do not match in position, and the amount of data in the horizontal and vertical directions of the chroma samples 320 is a half of the luma samples.

According to an embodiment of the invention, the luma samples may be used to calculate the predicted values of the chroma samples.

Expression 1 expresses the predicted values of the chroma samples.

$$P'_c(x, y) = \alpha \times 0.5 \times [P_L(2x, 2y) + P_L(2x, 2y+1)] + \beta$$

$P'_c$ represents the predicted value of a chroma sample in a block and $P_{L*}(x, y)=0.5\times[P_L(2x, 2y)+P_L(2x, 2y+1)]$ represents a luma sample of a reconstructed block. Parameters α and β may be derived from previously-reconstructed samples around the current block.

The sampling rate of the chroma samples may be half the sampling rate of the luma samples and may have a phase difference of 0.5 pixels in the vertical direction. The reconstructed luma samples may be down-sampled in the vertical direction and sub-sampled in the horizontal direction so as to match the phase and the size of the chroma samples.

Therefore, in the chroma sample prediction method according to the embodiment of the invention, it is possible to calculate the predicted values of the chroma samples reflecting the phase difference between the chroma samples and the luma samples by using the value of $P_{L*}(x, y)=0.5\times[P_L(2x, 2y)+P_L(2x, 2y+1)]$ as the sample value of the reconstructed luma block in consideration of the phase difference.

Expression 2 is a mathematic formula representing a method of calculating parameters α and β

Expression 2

$$\alpha = \frac{R(\hat{P}_{L*}, \hat{P}_C)}{R(\hat{P}_{L*}, \hat{P}_{L*})}$$

$$\beta = M(\hat{P}_C) - \alpha \times M(\hat{P}_{L*})$$

In Expression 2, R(•,•) may be defined as a function of calculating the relation value of input variables. For example, it is a correlation function or an auto covariance function which is a function of calculating the relation value between two variables $\hat{P}_{L*}$ and $\hat{P}_C$. M(•) Represents a function of calculating an average value. That is, α and β may be values calculated using linearly-interpolated sample values as variables. The method of calculating α and β using the linearly-interpolated sample values as variables belongs to the scope of the invention.

$P_{L*}$ represents a linearly-interpolated value of a reconstructed luma sample calculated in consideration of the phase difference as shown in Expression 3.

$$P_{L*}(x, y) = 0.5 \times [P_L(2x, 2y) + P_L(2x, 2y+1)]$$ Expression 3

Figure 4:
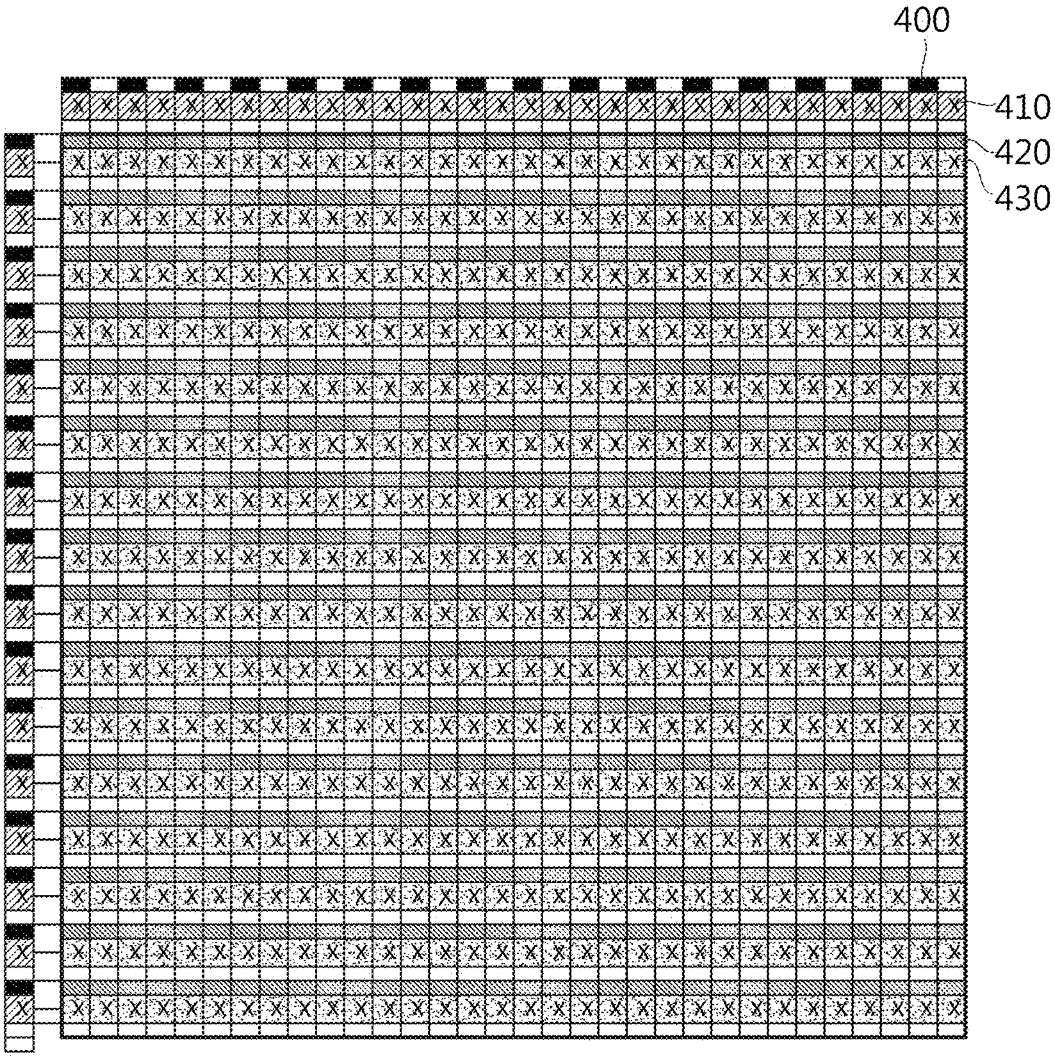
FIG. 4 is a diagram illustrating luma sample values around and inside a current block in an embodiment of the invention.

FIG. 4 is a diagram illustrating luma sample values located around and inside a current block according to an embodiment of the invention.

Referring to FIG. 4, a first sample 400 represents a sub-sampled luma sample used to calculate parameters α and β. A second sample 410 represents a sample obtained by linearly interpolating a sub-sampled luma sample used to calculate parameters α and β.

A third sample 420 represents a sub-sampled luma sample used to calculate a chroma sample. A fourth sample 430 represents a sub-sampled luma sample performed linear interpolation and used to calculate a chroma sample.

That is, in the chroma sample prediction method using luma samples according to the embodiment of the invention, luma sample values may be calculated by performing the linear interpolation in consideration of the difference in distance between the luma samples and the chroma samples and linearly-interpolated luma sample, not luma sample itself, may be used to predict the chroma samples. By using this linear interpolation method, it is possible to further accurately predict the chroma signal in an image format in which the chroma signal and the luma signal are different in position. The luma sample values may be calculated by performing the linear interpolation on the basis of the difference in phase and sampling rate between the luma samples and the chroma samples. This embodiment also belongs to the scope of the invention.

In an embodiment in which an LM is used, the following method may be used.

The following expressions represent calculating intra-predicted values of a chroma block using the LM.

Expression 4

$$k3 = \mathrm{Max}(0, BitDepth_C + \mathrm{Log2}(nS) - 14)$$

$$p'_Y[x, -1] = (p_{LM}[2x-1, -1] + 2*P_{LM}[2x, -1] + P_{LM}[2x+1, -1] + 2) \gg 2, \quad \text{with } x = 0 \ldots nS-1$$

$$p'_Y[-1, y] = (P_{LM}[-1, 2y] + P_{LM}[-1, 2y+1]) \gg 1, \text{ with } y = 0 \ldots nS-1$$

$$p'_Y[x, y] = (recSamples_L[2x, 2y] + recSamples_L[2x, 2y+1]) \gg 1, \quad \text{with } x, y = 0 \ldots nS-1$$

In Expression 4, a new first variable may be calculated using the linear interpolation as described above.

A second variable for calculating α and β may be calculated using the first variable calculated through Expression 4, as shown in Expression 5.

Expression 5

$$L = \left(\sum_{y=0}^{nS-1} p'_Y[-1, y] + \sum_{x=0}^{nS-1} p'_Y[x, -1]\right) \gg k3$$

$$C = \left(\sum_{y=0}^{nS-1} p[-1, y] + \sum_{x=0}^{nS-1} p[x, -1]\right) \gg k3$$

$$LL = \left(\sum_{y=0}^{nS-1} p'_Y[-1, y]^2 + \sum_{x=0}^{nS-1} p'_Y[x, -1]^2\right) \gg k3$$

$$LC = \left(\sum_{y=0}^{nS-1} p'_Y[-1, y]*p[-1, y] + \sum_{y=0}^{nS-1} p'_Y[x, -1]*p[x, -1]\right) \gg k3$$

$$k2 = \mathrm{Log2}((2*nS) \gg k3)$$

The values of α and β may be calculated on the basis of the second variable, which is calculated through Expression 5, using Expression 6.

Expression 6

$$a1 = (LC \ll k2) - L*C$$

$$a2 = (LL \ll k2) - L*L$$

$$k1 = \mathrm{Max}(0, \mathrm{Log2}(\mathrm{abs}(a2)) - 5) - \mathrm{Max}(0, \mathrm{Log2}(\mathrm{abs}(a1)) - 14 + 2$$

$$a1s = a1 \gg \mathrm{Max}(0, \mathrm{Log2}(\mathrm{abs}(a1)) - 14)$$

$$a2s = \mathrm{abs}(a2 \gg \mathrm{Max}(0, \mathrm{Log2}(\mathrm{abs}(a2)) - 5))$$

$$a3 = a2s < 1\ ?\ 0 : \mathrm{Clip3}\left(-2^{15}, 2^{15}-1, a1s*lmDiv + (1 \ll (k1-1)) \gg k1\right)$$

$$\alpha = a3 \gg \mathrm{Max}(0, \mathrm{Log2}(\mathrm{abs}(a3)) - 6)$$

$$k = 13 - \mathrm{Max}(0, \mathrm{Log2}(\mathrm{abs}(\alpha)) - 6)$$

$$\beta = (L - ((\alpha*C) \gg k1) + (1 \ll (k2-1))) \gg k2$$

The chroma block samples using the LM may be calculated on the basis of a and B, which are calculated through Expression 6, using Expression 7.

Expression 7

$$predSamples[x, y] = \mathrm{Clip1}_C(((p'_Y[x, y]*\alpha) >> \mathrm{k}) + \beta), \quad \text{with } x, y - 0 \ldots nS-1$$

In Expressions 4 to 7, similarly to the above-mentioned method, linear interpolation may be performed on the basis of the relation between the chroma sample and the luma sample, α and β may be calculated using the relation between the calculated variables, and intra prediction may be performed using the LM in the chroma block on the basis of the calculated values.

This method premises that an image format is YUV 4:2:0. When the image format is an image format other than the YUV 4:2:0 (for example, 4:4:4 or 4:0:0), the above-described linear interpolation expression may vary depending on the positional relation between the chroma sample and the luma sample. This embodiment also belongs to the scope of the invention.

Table 1 represents intra prediction modes and intra prediction mode indices mapped onto the intra prediction modes according to an embodiment of the invention.

TABLE 1

| Intra prediction mode | Associated names |
|---|---|
| 0 | Intra_Planar |
| 1 | Intra_DC |
| Otherwise (2 . . . 34) | Intra_Angular |
| 35 | Intra_FromLuma (used only for chroma) |

Referring to Table 1, the luma block may be intra-predicted using zeroth to 34-th intra prediction modes. The zeroth intra prediction mode is a planar mode, the first intra prediction mode is a DC mode as a non-directive intra prediction mode, and the second to 34-th intra prediction modes are directive intra prediction modes. The intra prediction may be performed on the basis of prediction angles different depending on the indices.

Figure 5:
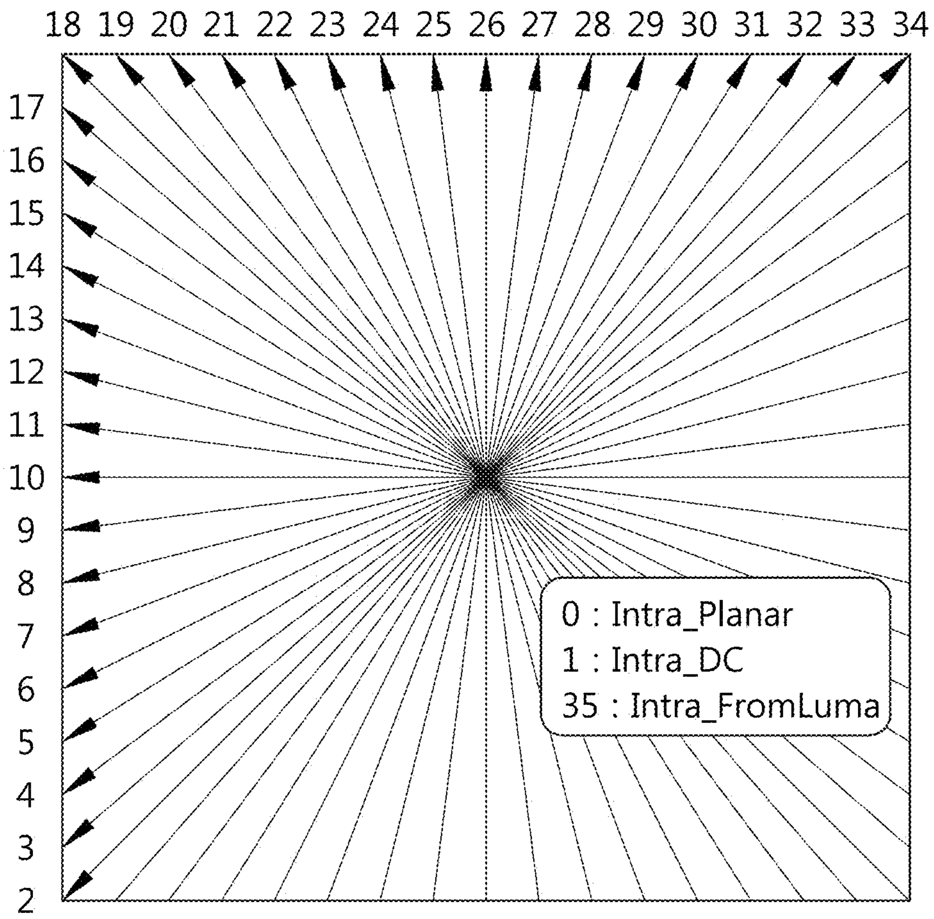
FIG. 5 is a diagram illustrating a directive intra prediction mode in an embodiment of the invention.

FIG. 5 is a conceptual diagram illustrating a directive intra prediction method according to an embodiment of the invention.

Referring to FIG. 5, the directive intra prediction modes have different intra prediction directions in the clockwise direction from the second intra prediction mode up to the 34-th intra prediction mode.

All the directive intra prediction modes shown in FIG. 5 may be used to perform intra prediction on a luma block. However, all the directive intra prediction modes are not used but only some directive intra prediction modes may be used to perform intra prediction on a chroma block.

The intra prediction on a chroma block may use an oblique intra prediction mode (the 34-th intra prediction mode), a vertical intra prediction mode (the 26-th intra prediction mode), a horizontal intra prediction mode (the tenth intra prediction mode), and a DC intra prediction mode. In addition, an LM (Luma Estimated Mode) in which a chroma block is predicted on the basis of a reconstructed luma block which is an intra prediction mode different from that of a luma block and a DM (Luma Directed Mode) which is the same intra prediction mode as the luma block may be used to intra-predict a chroma block.

Table 2 is a table illustrating the mapping relationship between the intra prediction mode and the intra prediction mode index when the LM, the vertical intra prediction mode (VER), the horizontal intra prediction mode (HOR), the DC intra prediction mode, and the DM are used to intra-predict a chroma block.

TABLE 2

| | Prediction mode of luma component | | | |
|---|---|---|---|---|
| intra_chroma_pred_type | VER | HOR | DC | ANG(X) |
| 0 | LM | LM | LM | IM |
| 1 | n/a | VER | VER | VER |
| 2 | HOR | n/a | HOR | HOR |
| 3 | DC | DC | n/a | DC |
| 4 | VER | HOR | DC | X. |

Referring to Table 2, the intra prediction on a chroma block may be performed using the LM (Luma Estimated Mode) when intra_chroma_pred_type is 0, the vertical intra prediction mode (VER) when intra_chroma_pred_type is 1, the horizontal intra prediction mode (HOR) when intra_chroma_pred_type is 2, the DC intra prediction mode when intra_chroma_pred_type is 3, and the DM (Luma Directed Mode) when intra_chroma_pred_type is 4.

When a luma block and a chroma block use the same intra prediction mode, the intra prediction mode of the chroma block may be expressed by the DM and thus it is not necessary to map the intra prediction mode index onto one intra prediction mode of the above-mentioned five intra prediction modes of a chroma block. For example, when the intra prediction mode of a luma block is the vertical intra prediction mode (VER) and the intra prediction mode of a chroma block is the vertical intra prediction mode (VER), the intra prediction mode of the chroma block may be expressed by the DM of intra_chroma_pred_type 4 and thus it is not necessary to map the intra prediction mode on the intra_chroma_pred_type 1. In the same manner, when the intra prediction mode of a luma block is the vertical intra prediction mode (VER), the horizontal intra prediction mode (HOR), and the DC intra prediction mode (DC), the intra prediction mode of a chroma block may be expressed by four intra_chroma_pred_types.

When the intra prediction mode of a luma block is the directive intra prediction modes other than the vertical intra prediction mode, the horizontal intra prediction mode, and the DC mode, the DM mode and the intra prediction mode of the luma block do not overlap and thus the intra prediction on the chroma block may be performed using five intra_chroma_pred_types, unlike the case where the DM mode and the intra prediction mode of the luma block overlap.

The intra prediction mode used to perform the intra prediction on a chroma block and the mapping relationship between the intra prediction mode and the intra prediction mode index may arbitrarily change. Whether the LM should be used for a chroma block may be determined in the encoding and decoding step, and Table 2 may vary depending on whether the LM is used.

For example, as described in tables 3 and 4, the oblique intra prediction mode (the 34-th intra prediction mode) and the planar mode may be additionally used as the intra prediction mode of a chroma block.

Table 3 shows the mapping relationship between the intra prediction mode of a chroma block and the intra prediction mode indices when the intra prediction on the chroma block is performed without using the LM.

TABLE 3

| | IntraPredMode[xB][yB] | | | | |
|---|---|---|---|---|---|
| intra_chroma_pred_mode | 0 | 26 | 10 | 1 | X (0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

Referring to Table 3, intra_chroma_pred_mode 0 is mapped on the planar mode, intra_chroma_pred_mode 1 is mapped on the vertical intra prediction mode (the 26-th intra prediction mode), intra_chroma_pred_mode 2 is mapped on the horizontal intra prediction mode (the tenth intra prediction mode), intra_chroma_pred_mode 3 is mapped on the DC mode (the first intra prediction mode), and intra_chroma_pred_mode 4 is mapped on the DM.

When the intra prediction mode of a luma block is the planar mode, the vertical mode, the horizontal mode, or the DC mode, the intra prediction mode of a chroma block may be expressed by the DM. Accordingly, the oblique intra prediction mode (the 34-th intra prediction mode) instead of the intra prediction mode expressed by the DM may be used as an additional intra prediction mode to intra-predict a chroma block.

Table 4 shows the relationship between the intra prediction mode of a luma block and the intra prediction mode of a chroma block when the intra prediction is performed on the chroma block using the LM mode.

TABLE 4

| | IntraPredMode[xB][yB] | | | | |
|---|---|---|---|---|---|
| intra_chroma_pred_mode | 0 | 26 | 10 | 1 | X (0 <= X < 35 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X |

Referring to Table 4, the intra prediction modes of a chroma block may be mapped on the planar mode when intra_chroma_pred_mode is 0, the vertical intra prediction mode when intra_chroma_pred_mode is 1, the horizontal intra prediction mode when intra_chroma_pred_mode is 2, the DC mode when intra_chroma_pred_mode is 3, the LM when intra_chroma_pred_mode is 4, and the DM when intra_chroma_pred_mode is 5.

Similarly to Table 4, the intra prediction mode of a luma block is the planar mode, the vertical mode, the horizontal mode, and the DC mode, the intra prediction mode of a chroma block may be expressed by the DM. Accordingly, the oblique intra prediction mode (the 34-th intra prediction mode) instead of the intra prediction mode among the intra_chroma_pred_modes, which may be expressed by the DM, may be used.

In the intra prediction modes of a chroma block mapped as described above, the intra prediction mode information of a chroma block may be transferred through the use of a codeword mapping method shown in Table 6.

The table like Table 3 in which the intra prediction modes of a luma block are mapped on the intra prediction modes of a chroma block without including the LM is defined as a non-LM mapping table. The table like Table 4 in which the intra prediction modes of a luma block are mapped on the intra prediction modes of a chroma block to include the LM is defined as an LM mapping table.

Referring to Tables 3 and 4, an intra prediction mode unnecessary due to the DM is set to the oblique intra prediction mode (the 34-th intra prediction mode). However, the intra prediction modes other than the 34-th intra prediction mode, such as the 18-th intra prediction mode and the second intra prediction mode, may be used instead of the 34-th intra prediction mode. This embodiment also belongs to the scope of the invention.

Information on what intra prediction mode should be used as a substituent intra prediction mode may be expressed by schedo codes as described in the below table.

TABLE 5

```
For(int i=2;i<6;i++)
{
  If(chroma_mode[i] == luma_mode)
  {
    chroma_mode[i]=SUBSTITUTE_MODE
    Break;
  }
}
```

Referring to Table 5, when the intra prediction mode of a luma block and the intra prediction mode of a chroma block are equal to each other, the intra prediction mode to substitute the same intra prediction mode of a chroma block as the intra prediction mode of a luma block may be expressed by syntax element information such as substitute_mode to perform the intra prediction on the chroma block.

In order to signal the intra prediction mode of a chroma block as described in the above-mentioned embodiments, codewords may be mapped on the intra prediction modes to signal the intra prediction modes as described in the below table.

Table 6 is a table in which codewords are mapped on the intra prediction modes of a chroma block according to an embodiment of the invention.

TABLE 6

| Mode number | Mode Name | Codeword |
|---|---|---|
| 0 | Luma Directed Mode | 0 |
| 1 | Luma Estimated Mode | 10 |
| 2 | Vertical Mode | 110 |
| 3 | Horizontal Mode | 1110 |
| 4 | DC Mode | 1111 |

Referring to Table 6, there are mode numbers, intra prediction mode names mapped on the mode numbers, and codewords corresponding thereto. The DM is mapped on codeword "0", the LM is mapped on codeword "10", the vertical mode is mapped on codeword "110", the horizontal mode is mapped on codeword "1110", and the DC mode is mapped on codeword "1111". As described in Table 6, a fixed codewords may be mapped on the intra prediction modes of a chroma block regardless of the intra prediction modes of a luma block, or a method of not mapping a codeword on a non-used intra prediction mode but mapping codewords on the used intra prediction modes depending on the intra prediction mode of a luma block may be used.

TABLE 6-1

| | Prediction mode of luma component | | | |
|---|---|---|---|---|
| intra_chroma_pred_type | VER | HOR | DC | ANG(X) |
| 0 | 10 | 10 | 10 | 10 |
| 1 | n/a | 111 | 111 | 111 |
| 2 | 111 | n/a | 110 | 1111 |
| 3 | 110 | 110 | n/a | 1110 |
| 4 | 0 | 0 | 0 | 0 |

Referring to Table 6-1, by not mapping a codeword on a non-used intra prediction mode but mapping codewords on the used intra prediction modes depending on the intra prediction mode of a luma block, the codewords for expressing the intra prediction modes of a chroma block may be flexibly mapped depending on the intra prediction mode of a luma block.

As another method of mapping the intra prediction modes and the codewords, a fixed codeword mapping method as described in Table 7 may be used when the intra prediction modes of a chroma block are mapped on the codewords as described in Tables 3 and 4.

TABLE 7

| mode_idx | IHE | ILC |
|---|---|---|
| DM | 0 | 0 |
| LM | 10 | X |
| mode 0 | 1100 | 100 |
| mode 1 | 1101 | 101 |
| mode 2 | 1110 | 110 |
| mode 3 | 1111 | 111 |

Referring to Table 7, in order to predict the intra prediction modes of a chroma block, the case where the intra prediction is performed to include the LM and the case where the intra prediction is performed without using the LM may be distinguished as described above, and the intra prediction modes and the codewords corresponding to the intra prediction modes may be mapped according to one of the cases.

When the intra prediction mode on a chroma block is performed to include the LM, the intra prediction on a chroma block may be performed using the DM, the LM, and the four intra prediction modes (mode 0, mode 1, mode 2, and mode 3). When the intra prediction on a chroma block is performed without using the LM, the intra prediction may be performed using the DM and four intra prediction modes (mode 0, mode 1, mode 2, and mode 3).

The codewords described in Table 7 may be encoded and decoded through the use of a bypassing method of bypassing the values themselves without using any context. In the bypassing method, all bits of a codeword may be bypassed, but bits representing the DM and bits representing the LM may be encoded using a context. That is, when the LM mode is used, first two bits are encoded using a context. When the LM mode is not used, only the first bit may be context-encoded. The codeword encoding method is arbitrary and various methods may be used. For example, when calculation does not have to be performed fast, contexts may be assigned to all bits of a codeword to encode the bits. The variousbinarization method of the intra prediction mode may be used.

Table 8 is a table representing the mapping relationship between intra prediction modes and codewords when mode 0 is the planar mode, mode 1 is the vertical intra prediction mode, mode 2 is the horizontal intra prediction mode, and mode 3 is the DC intra prediction mode on the basis of the mapping relationship between the intra prediction modes of a chroma block and the codewords shown in Table 7.

expressing the same intra prediction mode information may vary depending on whether the LM is used.

The codeword including the intra prediction mode of a chroma block is received (step S610).

The codeword information encoded on the basis of the mapping relationship between the intra prediction modes and the codewords as described in Tables 6 and 7 may be received.

The intra prediction mode information of a chroma block is decoded on the basis of the received codeword information (step S620).

As described above, there are various mapping tables between the codewords and the intra prediction modes. The intra prediction mode information of a chroma block may be decoded on the basis of a lookup table representing the mapping relationship between the codewords and the intra prediction modes.

For example, when the intra prediction on a chroma block is performed using the LM, the encoding device may encode information representing that a chroma block is encoded in the intra prediction mode including the LM as flag information, and the decoding device may decode the intra prediction mode information of the chroma block on the basis of the flag information.

The received codeword information may be decoded into the intra prediction mode information on the basis of a lookup table.

TABLE 8

| Value of intra_chroma_pred_mode | chroma_pred_from_luma_enabled_flag = 1 | chroma_pred_from_luma_enabled_flag = 0 |
|---|---|---|
| 5 | 0 | n/a |
| 4 | 10 | 0 |
| 0 | 1100 | 100 |
| 1 | 1101 | 101 |
| 2 | 1110 | 110 |
| 3 | 1111 | 111 |

Referring to Table 8, chroma_pred_from_luma_enabled_flag=1 represents that the intra prediction on a chroma block is performed using the LM. Codewords may be fixedly mapped on the corresponding intra prediction modes such as the DM when intra_chroma_pred_mode is 5, the LM when intra_chroma_pred_mode is 4, the planar mode when intra_chroma_pred_mode is 0, the VER when intra_chroma_pred_ mode is 1, the HOR when intra_chroma_pred_mode is 2, and the DC when intra_chroma_pred_mode is 3.

Chroma_pred_from_luma_enabled_flag-0 represents that the intra prediction on a chroma block is performed without using the LM mode. Codewords may be fixedly mapped on the corresponding intra prediction modes such as the DM when intra_chroma_pred_mode is 4, the planar mode when intra_chroma_pred_mode is 0, the VER when intra_chroma_pred_mode is 1, the HOR when intra_chroma_pred_mode is 2, and the DC when intra_chroma_pred_mode is 3.

Figure 6:
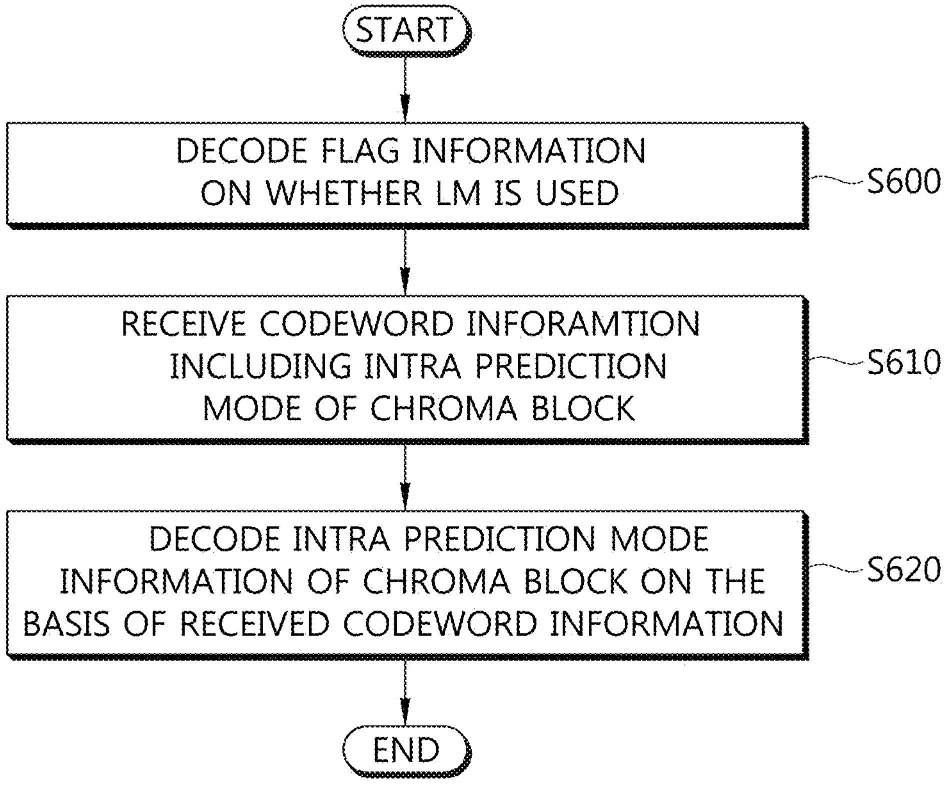
FIG. 6 is a flowchart illustrating a method of calculating an intra prediction mode of a chroma block in an embodiment of the invention.

FIG. 6 is a flowchart illustrating a method of calculating an intra prediction mode of a chroma block according to an embodiment of the invention.

Referring to FIG. 6, flag information on whether the LM is used is decoded (step S600).

When performing the intra prediction on a chroma block, the LM may be selected used and whether the LM is used to perform the intra prediction on a chroma block may be determined on the basis of the flag information representing whether the LM is used. As described above, the codeword For example, in Table 7, when the intra prediction mode information of a chroma block represents the LM, the encoding may be performed using "10" as the codeword information and "10" which the encoded codeword information may be received as the codeword information of the chroma block by the decoding device.

The decoding device may determine that the intra prediction mode of the chroma block which is being decoded currently is the LM on the basis of Table 7, and may decode the chroma block on the basis thereof.

Figure 7:
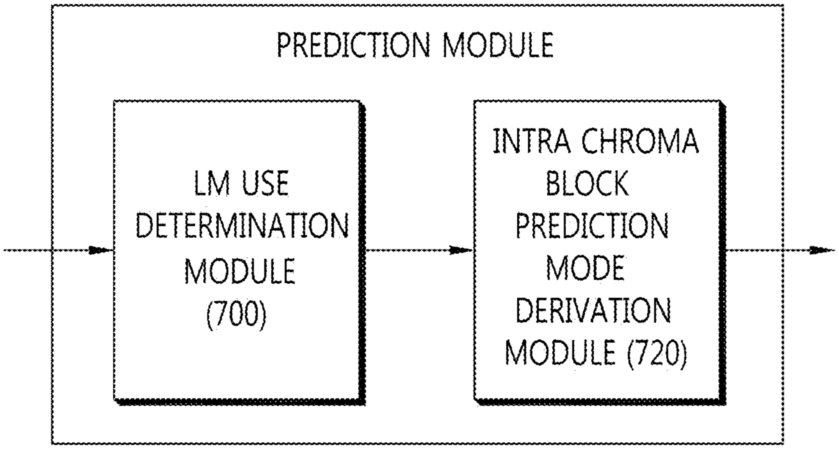
FIG. 7 is a conceptual diagram illustrating a part of a prediction module that decodes an intra prediction mode of a chroma block in an embodiment of the invention.

FIG. 7 is a conceptual diagram illustrating a part of a prediction module that decodes an intra prediction mode of a chroma block according to an embodiment of the invention.

Referring to FIG. 7, the prediction module includes an LM mode use determination module 700 and an intra chroma block prediction mode derivation module 720.

The LM mode use determination module 700 may determine whether the LM is used as the intra prediction mode of a chroma block of a current block on the basis of LM use flag information of the encoding device.

The intra chroma block prediction mode derivation module 720 may derive the intra prediction mode information on by what intra prediction mode to encode and decode the current chroma block on the basis of the mapping relationship between the codewords and the intra prediction modes of a chroma block.

For example, by using chroma_pred_flag_luma_enabled_pred_mode which is the flag information as described in Table 7, it may be determined whether the LM is used for the intra prediction mode of the current chroma block. When the LM is used and "110" is received as the codeword information, it represents that the second intra prediction mode is used as the intra prediction mode (intra_chroma_pred_mode) of the current chroma block. It is possible to derive the intra prediction mode information of the current chroma block in consideration of the intra prediction mode information of a luma block using Table 7 on the basis of the information of intra_chroma_pred_mode.

By using the above-mentioned intra prediction mode including the LM, it is possible to express the use of the LM by the use of the flag information depending on the nature of a picture and to perform the intra prediction. The value of intra_chroma_pred_mode may be derived by using different codeword mapping tables depending on whether the LM is used. The intra prediction mode of a chroma block may be derived using the LM mapping table or the non-LM mapping table based on whether the LM is used depending on the derived value of intra_chroma_pred_mode. By employing this method, it is possible to reduce the number of bits which is unnecessarily wasted and to transfer only necessary intra prediction mode information.

The image encoding method and the image decoding method described above may be embodied by the constituents of the image encoding device and the image decoding device described above with reference to FIGS. 1 and 2.

While the invention has been described with reference to the embodiments, it will be able to be understood by those skilled in the art that the invention may be modified and changed in various forms without departing from the spirit and scope of the invention described in appended claims.

The invention claimed is:

1. An image decoding method by a decoding apparatus, the method comprising:

receiving image information including information related to an intra chroma prediction mode for a chroma component block of a current block;

deriving an intra prediction mode for the chroma component block based on the information related to the intra chroma prediction mode and an intra prediction mode for a luma component block of the current block;

deriving a predicted block based on the intra prediction mode for the chroma component block; and generating a reconstructed picture based on the predicted block, wherein the information related to the intra chroma prediction mode is related to one of a chroma prediction mode based on a reconstructed luma component block, a vertical mode, a horizontal mode, a DC mode, and a mode identical to the intra prediction mode for the luma component block, wherein based on the chroma prediction mode based on the reconstructed luma component block, the predicted block is derived based on linear model parameters and a linearly interpolated reconstructed sample of the luma component block, and wherein the linearly interpolated reconstructed sample is derived by linearly interpolating reconstructed samples of the luma component block.

2. An image encoding method by an encoding apparatus, the method comprising:

determining an intra luma prediction mode for a luma component block of a current block;

determining an intra chroma prediction mode for a chroma component block of the current block;

generating information related to the intra chroma prediction mode for the chroma component block of the current block based on the intra luma prediction mode and the intra chroma prediction mode;

deriving a predicted block of the current block based on the intra chroma prediction mode;

generating residual information of the current block based on the predicted block; and encoding image information including the information related to the intra chroma prediction mode and the residual information, wherein the information related to the intra chroma prediction mode is related to one of a chroma prediction mode based on a reconstructed luma component block, a vertical mode, a horizontal mode, a DC mode, and a mode identical to an intra prediction mode for the luma component block, wherein based on the chroma prediction mode based on the reconstructed luma component block, the predicted block is derived based on linear model parameters and a linearly interpolated reconstructed sample of the luma component block, and wherein the linearly interpolated reconstructed sample is derived by linearly interpolating reconstructed samples of the luma component block.

3. A transmission method of data for an image, the method comprising:

obtaining a bitstream for the image, wherein the bitstream is generated based on determining an intra luma prediction mode for a luma component block of a current block, determining an intra chroma prediction mode for a chroma component block of the current block, generating information related to the intra chroma prediction mode for the chroma component block of the current block based on the intra luma prediction mode and the intra chroma prediction mode, deriving a predicted block of the current block based on the intra chroma prediction mode, generating residual information of the current block based on the predicted block, and encoding image information including the information related to the intra chroma prediction mode and the residual information; and transmitting the data comprising the bitstream, wherein the information related to the intra chroma prediction mode is related to one of a chroma prediction mode based on a reconstructed luma component block, a vertical mode, a horizontal mode, a DC mode, and a mode identical to an intra prediction mode for the luma component block, wherein based on the chroma prediction mode based on the reconstructed luma component block, the predicted block is derived based on linear model parameters and a linearly interpolated reconstructed sample of the luma component block, and wherein the linearly interpolated reconstructed sample is derived by linearly interpolating reconstructed samples of the luma component block.

* * * * *